United States Patent
Hotle et al.

(10) Patent No.: US 7,266,652 B1
(45) Date of Patent: Sep. 4, 2007

(54) SYSTEM AND METHOD FOR MANAGING DATA CONSISTENCY BETWEEN DIFFERENT DATA VOLUMES ON ONE OR MORE DATA STORAGE SYSTEMS IN A DATA STORAGE ENVIRONMENT

(75) Inventors: William P. Hotle, Apex, NC (US); Alan L. Taylor, Apex, NC (US); Nagapraveen Veeravenkata Seela, Cary, NC (US)

(73) Assignee: EMC Corporation, Hopkinton, MA (US)

( * ) Notice: Subject to any disclaimer, the term of this patent is extended or adjusted under 35 U.S.C. 154(b) by 413 days.

(21) Appl. No.: 10/881,880

(22) Filed: Jun. 30, 2004

(51) Int. Cl.
*G06F 12/00* (2006.01)
(52) U.S. Cl. ...................... 711/158; 711/210
(58) Field of Classification Search ................ 711/141, 711/158, 210
See application file for complete search history.

(56) References Cited

U.S. PATENT DOCUMENTS

| | | | | |
|---|---|---|---|---|
| 5,206,939 A | * | 4/1993 | Yanai et al. ................... | 711/4 |
| 5,778,394 A | * | 7/1998 | Galtzur et al. ............... | 707/205 |
| 5,778,395 A | * | 7/1998 | Whiting et al. .............. | 707/204 |
| 5,835,953 A | * | 11/1998 | Ohran ......................... | 711/162 |
| 5,845,147 A | * | 12/1998 | Vishlitzky et al. ............. | 710/5 |
| 5,857,208 A | * | 1/1999 | Ofek ........................... | 707/204 |
| 5,881,311 A | * | 3/1999 | Woods .......................... | 710/4 |
| 6,101,497 A | * | 8/2000 | Ofek ........................... | 707/10 |

* cited by examiner

*Primary Examiner*—Reba I. Elmore
(74) *Attorney, Agent, or Firm*—K. Gupta; R. K. Perkins; C. A. Giordano

(57) ABSTRACT

This invention enables managing data consistency between different data volumes by managing I/O traffic in a data storage environment. A methodology for managing data consistency, in accordance with the principles of the invention, comprises the steps of arresting processing of I/O traffic during an administrative operation, queuing any I/O that follow the arresting step in a queuing data structure and processing each queued I/O until the I/O processing is completed. Certain implementations of the invention include a system, a computer program product, or an apparatus, wherein each embodiment is configured for carrying out the steps involved in the methodology.

16 Claims, 7 Drawing Sheets

SYSTEM AND METHOD FOR MANAGING DATA CONSISTENCY BETWEEN DIFFERENT DATA VOLUMES ON ONE OR MORE DATA STORAGE SYSTEMS IN A DATA STORAGE ENVIRONMENT

A portion of the disclosure of this patent document contains command formats and other computer language listings, all of which are subject to copyright protection. The copyright owner, EMC Corporation, has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This application generally relates to data storage management, and more particularly to managing data consistency between different data volumes on one or more data storage systems in a data storage environment

BACKGROUND

Computer systems may include different resources used by one or more host processors. Resources and host processors in a computer system may be interconnected by one or more communication connections. These resources may include, for example, data storage systems, such as the Symmetrix™ or Clariion™ family of data storage systems manufactured by EMC Corporation. These data storage systems may be coupled to one or more host processors and provide storage services to each host processor. An example data storage system may include one or more data storage devices, such as those of the Symmetrix™ family, that are connected together and may be used to provide common data storage for one or more host processors in a computer system.

A host processor may perform a variety of data processing tasks and operations using the data storage system. For example, a host processor may perform basic system I/O operations in connection with data requests such as data read and write operations. Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units either may or may not correspond to the actual disk drives. Allowing multiple host systems to access the single storage device unit allows the host systems to share data stored therein.

It is desirable to copy or replicate data for a variety of different reasons, such as, for example, database-related data may be critical to a business so it is important to make sure is not lost due to problems with the computer systems, such as for example, loss of electrical power. However, there are costs associated with backing up or otherwise copying or replicating data. Such costs include the data being unavailable to an application that may require access to it. For example, in a normal business operation, not as a production environment, data may be needed for an update or in relation to a transaction on a close to full-time (i.e. 24 hours a day, 7 days a week) basis.

To provide for data security, replicas or copies of production data are often transferred out of the production environment into a replica environment including a replica storage system. Unfortunately, if a problem occurs with the production environment there may be an inconsistency between data volumes stored on the production environment's data storage system and supposedly replica data volumes copied to the replica environment. There is a need for some low-cost way to reduce such inconsistencies that is simple to use in a data storage environment.

SUMMARY OF THE INVENTION

To overcome the problems of the prior art mentioned above and to provide advantages also described above, this invention enables managing consistency between different data volumes on one or more data storage systems by managing I/O (Input/Output) traffic in a data storage environment. In one embodiment, a methodology for managing data consistency, in accordance with the principles of the invention, comprises the steps of arresting processing of I/O traffic during an administrative operation, queuing any I/O that follow the arresting step in a queuing data structure and processing each queued I/O until the I/O processing is completed. In other embodiments, implementations include a system, a computer program product, or an apparatus, wherein each embodiment is configured for carrying out the steps involved in the methodology.

BRIEF DESCRIPTION OF THE DRAWING

The above and further advantages of the present invention may be better under stood by referring to the following description taken into conjunction with the accompanying drawings in which.

DETAILED DESCRIPTION OF THE PREFERRED EMBODIMENTS

Introduction

Figure 1:
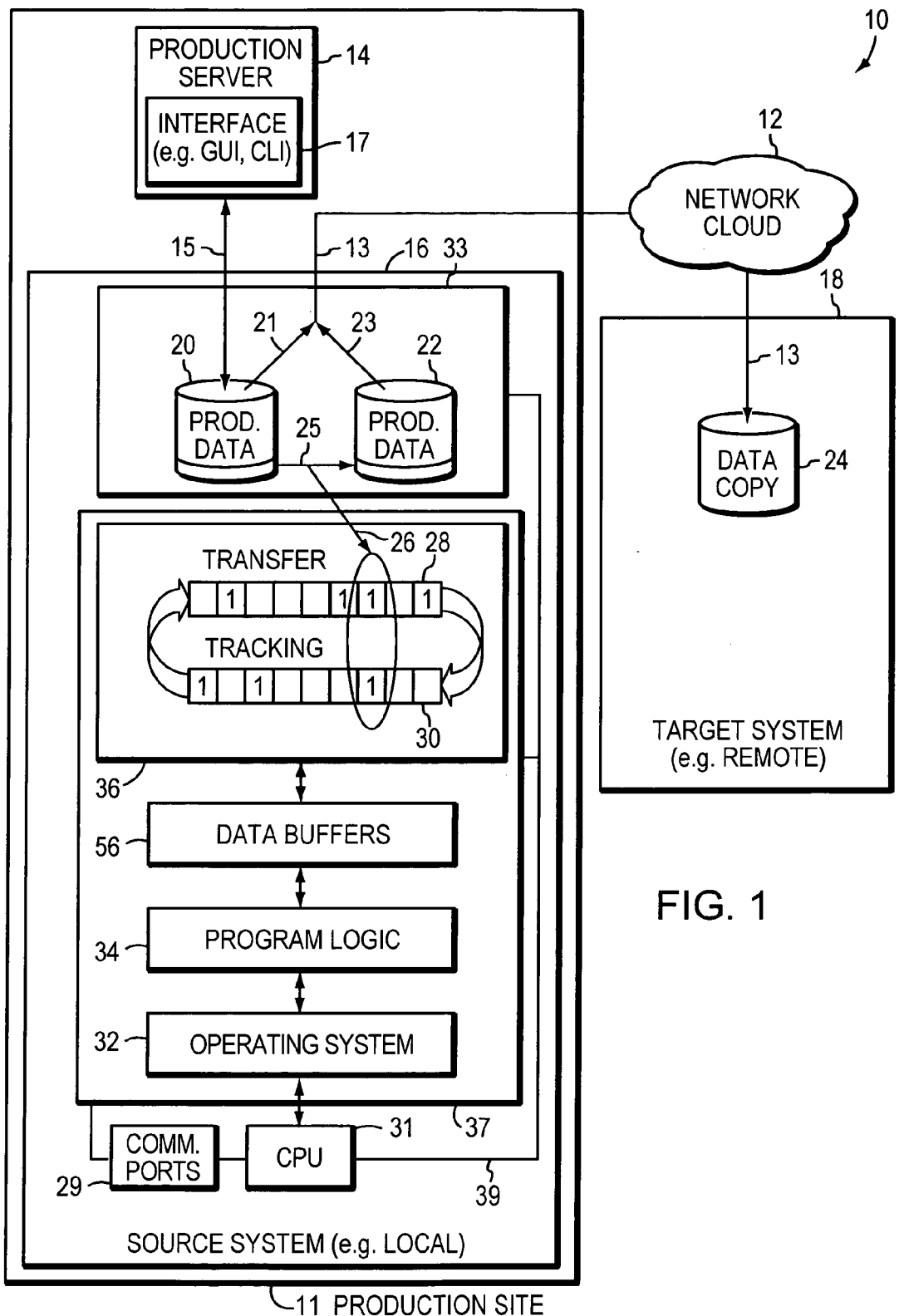
FIG. 1 shows a block diagram schematic of an embodiment of a data storage environment including one or more data storage systems and including a Production Site and further including program logic or program code for carrying out the method embodiments of the present invention.

In the preferred embodiment, the preferred invention operates in cooperation and may be a part of computer software, such EMC Corporation's SAN (Storage Area Network) Copy software. SAN Copy is configured for allowing central manage movement of data between data storage systems, e.g. the preferred EMC CLARiiON and Symmetrix storage systems available from EMC Corporation of Hopkinton, Mass., although one skilled in the art will recognize that the invention may be used with other data storage systems. Preferably, SAN Copy is a storage-based implementation to remove impact from a server which may be hosting application software in a production environment.

Typically, SAN Copy operates in cooperation, with EMC's TimeFinder and SnapView local replication applications, eliminating the impact to production activities by using Business Continuance Volumes (BCV's) (discussed in the incorporated '497 patent referenced below) or Snapshots as source volumes so applications stay online throughout the data movement process. However, the present invention may be used without requirement of such BCV's or Snapshots. For the sake of completeness, operational features embodied in EMC's Timefinder and Symmetrix are described in U.S. Pat. No. 6,101,497 issued Aug. 8, 2000, and also in U.S. Pat. No. 5,206,939 issued Apr. 27, 1993, each of which is assigned to EMC the assignee of this invention and each of which is hereby incorporated by reference. Consequently, the following discussion makes only general references to the operation of such systems.

SAN Copy is an embodiment of an array to array copy technology. Data is transferred from a source array to a remote destination array with no attached server involvement pertaining to the data movement (strictly storage array to array data communication). Incremental SAN Copy is an enhancement to the SAN Copy product that is offered by EMC Corporation and which allows customers to update data on remote arrays by sending only the modified data since the last time an incremental update had occurred, and in some versions enhancements of Incremental SAN Copy will be offered as Mirrorview-Asynchronous.

Snapview is other software available from EMC Corporation and which embodies important features of the present invention. SnapView embodies the invention which supports an incremental copy feature, by employing a session as a tracking mechanism to track the changes for an Incremental Copy Session and to maintain the consistency of a changing data image during the life of the data copy. The inventors have critically recognized that such a mechanism may be employed to advantageously minimize the performance impact of accessing production data for copying or replication.

With regard to some terminology in this application, it will be helpful to discuss some terms, shown in Table 1.

TABLE 1

Terminology

COFW: copy on first write. Mechanism for maintaining a pointer based point in time copy of data. The COFW policy insures the original version of data is saved before allowing the data to be modified.
Incremental SAN Copy (ISC): a feature that provides users with the ability to perform incremental updates to copies of their production data. These copies can reside on the same array as the production data, or on remote arrays. The data transfer is array-to-array without server involvement. ISC is an extension to the SAN Copy product. SAN Copy can also push data to target devices that are termed as foreign, i.e. non-CLARiiON arrays.
Incremental SnapView Session: a special SnapView Session that is created specifically for an ISC Session. These sessions are used to track which data areas of the source data are modified as well as protect the user selected point-in-time copy of the data while an incremental copy is in progress.
Delta Bitmap: data structure in SnapView that is used to track changes in granularities between 2 KB and 64 KB for an incremental SnapView session. The delta bitmap consists of two parts.
Tracking Bitmap - part of the delta bitmap that is currently tracking changes. The changes that are tracked do not result in a COFW.
Transfer Bitmap - The part of the delta bitmap that is used by the Incremental SnapView Session to provide SAN Copy with the data to be copied. It represents the changes from the last copy operation to the most recent "mark" operation.

Overview of a Preferred Embodiment

In a preferred embodiment, Program Logic cooperates with and may include EMC Incremental SAN Copy features that use the EMC SAN Copy and EMC SnapView program code and may also receive instructions from users through the GUI (Graphic User Interface) or CLI (Command Line Interface), or through dynamically linked other programs. One skilled in the art will recognize that the invention is not limited to such preferred embodiments; however, they are described herein as an example of implementing the invention. Returning to an exemplary embodiment overview, the user can specify the point-in-time copy of the data to be transferred to the remote arrays by "marking" the data via an administrative command. Any time after the data has been "marked"; the user can initiate the SAN Copy transfer of the data to one or more remote arrays. After an initial full copy, subsequent copies will only copy portions of the production data that changed since the previous copy. Preferably, the communication and user input is provided by using some type of Administration program, e.g. EMC's Navisphere CLI or GUI product.

Preferred Embodiment Description

Referring to FIG. 1, Data Storage Environment 10 includes a Production Server 14 with an Interface 17 (e.g. a graphical user interface a.k.a. GUI or command line interface a.k.a. CLI) for communicating with Local Data Storage System 16 across path 15, and in particular for accessing Production Data 20, wherein Production Data Copy 22 is typically COFW data made for consistency and indicated along copy path 25, and wherein tracking actions along path 26 will be discussed below. The Production Data 20 is updated by write requests along path 15 in Server I/O, which results in regions of modified storage tracked by a tracking session 36. An incremental tracking session 36 on the Data Storage System 16 supports an incremental copy feature, such as the preferred Incremental SAN Copy feature available from EMC Corporation. For convenience, reference is made herein to a Production Site 11, which comprises the Production Server 14 and Local System 16.

The Data Storage System 16 may be considered a Source or Local system and replication, backup, or other copying may be performed to a Target or Remote system. The term remote as used herein means being on a different storage system, although this invention is applicable to source and target systems that actually are the same system but the data is sent to a different storage device or even a different location on the same storage device in the same system. For purposes of this invention it is sufficient to understand that the Remote System has storage devices (e.g. hard drives) that may function to duplicate or simulate some or all of the Local System on a volume-by-volume basis and that the volumes can be physical volumes, although logical volumes are preferred. Devices and volumes in a logical sense are also used interchangeably throughout. Note also that throughout this document, like symbols and identical numbers represent like and identical elements in the Figures. With further regard to terminology, copying is used throughout to generally refer to any way of duplicating data that is stored in one storage location (e.g. Production Data on the Source or Local System) to another storage location (e.g. Data Copy on the Target or Remote System) for any reason including, replication, backup, restore, or general mirroring. Although the invention is particularly useful in an environment employing a local and remote data storage system, it will become apparent upon reading this specification that the invention is also useful in a local system itself using copying or replication to a local volume.

Generally, such a data storage system as those described herein includes a system memory and sets or pluralities and of multiple data storage devices or data stores. The system memory can comprise a buffer or cache memory; the storage devices in the pluralities and can comprise disk storage devices, optical storage devices and the like. However, in a preferred embodiment the storage devices are disk storage devices. The sets represent an array of storage devices in any of a variety of known configurations. In such a data storage system, a computer or host adapter provides communications between a host system and the system memory and disk adapters and provides pathways between the system memory and the storage device pluralities. Regarding terminology related to the preferred data storage system, the host or host network is sometimes referred to as the front end and from the disk adapters toward the disks is sometimes referred to as the back end, and ports communicating from a data storage system toward each respective end are termed, respectively, front end ports and back end ports. Also disks may be addressed logically using logical volumes also known as logical units or LUN's, wherein the LUN's represent volumes of physical data on data storage devices such as disks. Mapping is used between such LUN's and physical data to achieve the representation. A bus interconnects the system memory, and communications with front and back end.

In a preferred embodiment the tracking session 36 is part of EMC's SAN COPY or Snapview product, or follow on products including Mirrorview Asynchronous or Mirrorview-A and preferably includes: (1) maintenance of two data structures, which for purposes of simple explanation are shown as bitmaps (but one skilled in the art will recognize that the invention is not limited to a specific data structure such as bitmaps), transfer bitmap 28 and tracking bitmap 30 for tracking incremental changes to the production data (the roles of the transfer and tracking bitmaps switch whenever a session is marked); (2) the ability to mark and unmark a point in time associated with a session; (3) reduced COFW overhead on access to Production Data 20 and 22, preferably in non-volatile memory 33, such as a computer hard drive, including: (a) No COFWs unless the session is marked; (b) COFWs only occur if the data had been marked to be copied in the transfer bitmap; and (c) the probability of having to perform a COFW diminishes while an ISC is in progress.

Generally, in a preferred embodiment the two bitmaps are used by the Program Logic 34 in cooperation with the operating system 32, and the CPU 31 on the source data storage system 16. The bitmaps and Program logic operate in electronic memory 37 and when executed by CPU 31 over communication path 39 carry out method steps embodying the invention. It is preferred that the Program Logic be computer software although it is possible for it to be embodied in whole or part in hardware or firmware. The Program Logic 34 (FIGS. 1 and 10) in a preferred embodiment encompasses at least in part the integration of EMC's Snapview with Incremental Copy SAN Copy and further with EMC's Mirrorview-Asynchronous product, each available from EMC of Hopkinton, Mass., USA. Data protected by this mechanism may span storage processors in the storage array.

Figure 8:
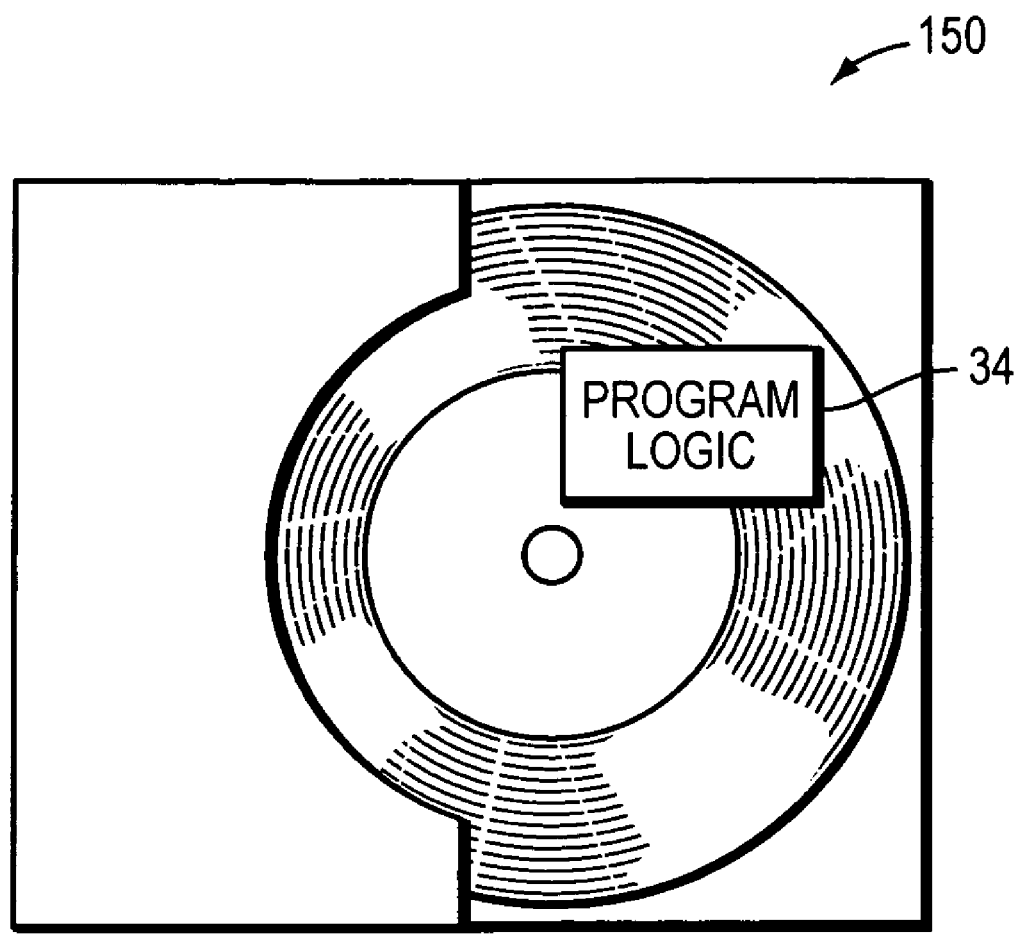
FIG. 8 shows a computer-readable medium including computer-executable code including at least some of the program logic of FIGS. 1, 2, and 3 for carrying out method steps of the method embodiments of the present invention.

Program Logic 34 may also be embodied on a computer-readable medium 150 as shown in FIG. 8, and wherein the Logic is encoded in computer-executable code configured for carrying out steps of a method embodiment of this invention. The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission. It may be implemented such that herein, when the program code is received and loaded into and executed by a machine, such as a computer, the machine becomes an apparatus for practicing the invention. When implemented on one or more general-purpose processors, the program code combines with such a processor to provide a unique apparatus that operates analogously to specific logic circuits.

Preferably, during the life of an Incremental Session, these two bitmaps swap their roles after a mark operation. After a session is marked, a COFW will be performed only if the transfer bitmap (which was the tracking bitmap before the mark) indicates that the specific region of the data is yet to be copied via ISC. Further, as the data is copied, the regions corresponding to the data transferred in the transfer bitmap are cleared which further reduces the amount of COFW activity needed. As the transfer proceeds, the probability of having to perform a COFW diminishes. These optimizations may significantly reduce the number of COFWs necessary to maintain a consistent copy of the production data and are an improvement of prior art systems that may include known pointer-based snapshot technologies.

Referring again to FIG. 1, Production Data 20, as it pertains to this invention, exists in two states: marked and unmarked. All write requests to Production Data, that has an incremental session associated with it, are tracked (i.e., records of regions on the storage where the change occurred is maintained in the tracking bitmap). Prior to making an incremental copy to Data Copy 24 on a Target or Remote Data Storage System or Storage Array 18, over a network cloud 12, which may be for example a wide area network, the state of the data is transitioned to indicate marked. Then in a preferred embodiment, the tracking bitmap becomes the transfer bitmap and a cleared transfer bitmap is used as the tracking bitmap. Thus, the role of the tracking and transfer bitmaps will switch each time data is marked. This switching of roles should be atomic in nature with respect to Production Server 14 writes to the Production Data 20. Changes to the Production Data since the last incremental copy are copied to one or more remote arrays only when the data is in the marked state. As soon as an incremental copy is completed the state of the production data is reverted to unmarked by the Program Logic 34.

The ISC process will transfer the regions indicated in the transfer bitmap. While the production data is being transferred, new server write requests are tracked for the next transfer. If a server write request is destined to modify a region that is going to be transferred (the transfer bitmap indicates that region is to be transferred), the data at the time of the mark needs to be preserved. The preferred incremental SnapView will perform a COFW of the region before the server write request is allowed to proceed. The ISC transfer, when it gets to the region that had a COFW performed upon it, will transfer the data that has been saved via the COFW. After a region has been transferred via ISC, the region in the transfer bitmap is cleared. This will reduce the probability of having to perform a COFW as the ISC proceeds. A COFW should be performed if the region indicated in the transfer bitmap is being overwritten before the regions have been transferred to the remote array or the resultant data copy will be inconsistent. This is represented by copy path 25 indicating a COFW from Production Data 20 to Production Data Copy 22. Along Path 26, changes to the transfer and tracking bit maps indicate the state of data that may be later transferred to Data Copy 24. Along path 21 and 23, data regions marked by the transfer bit map from either the Production Data or COFW Production Data Copy are sent over path or link 13 through Network Cloud 12 to Data Copy 24 on the Target 18. One skilled in the art will recognize that the Data Copy 24 could also reside on the same array or data storage system as the Production Data, but there are advantages related to availability of data in sending it to another system.

FIG. 1 also shows data buffers 56 that are memory resources for data transfer between the source and target system that are managed by components of the program logic 34, and specifically a copy manager driver that will be discussed below in detail, and in relationship to the communication (comm.) ports 29 of the source system. The comm. ports include front end and back end ports that are also discussed herein.

I/O Marshal Embodiment

Figure 2:
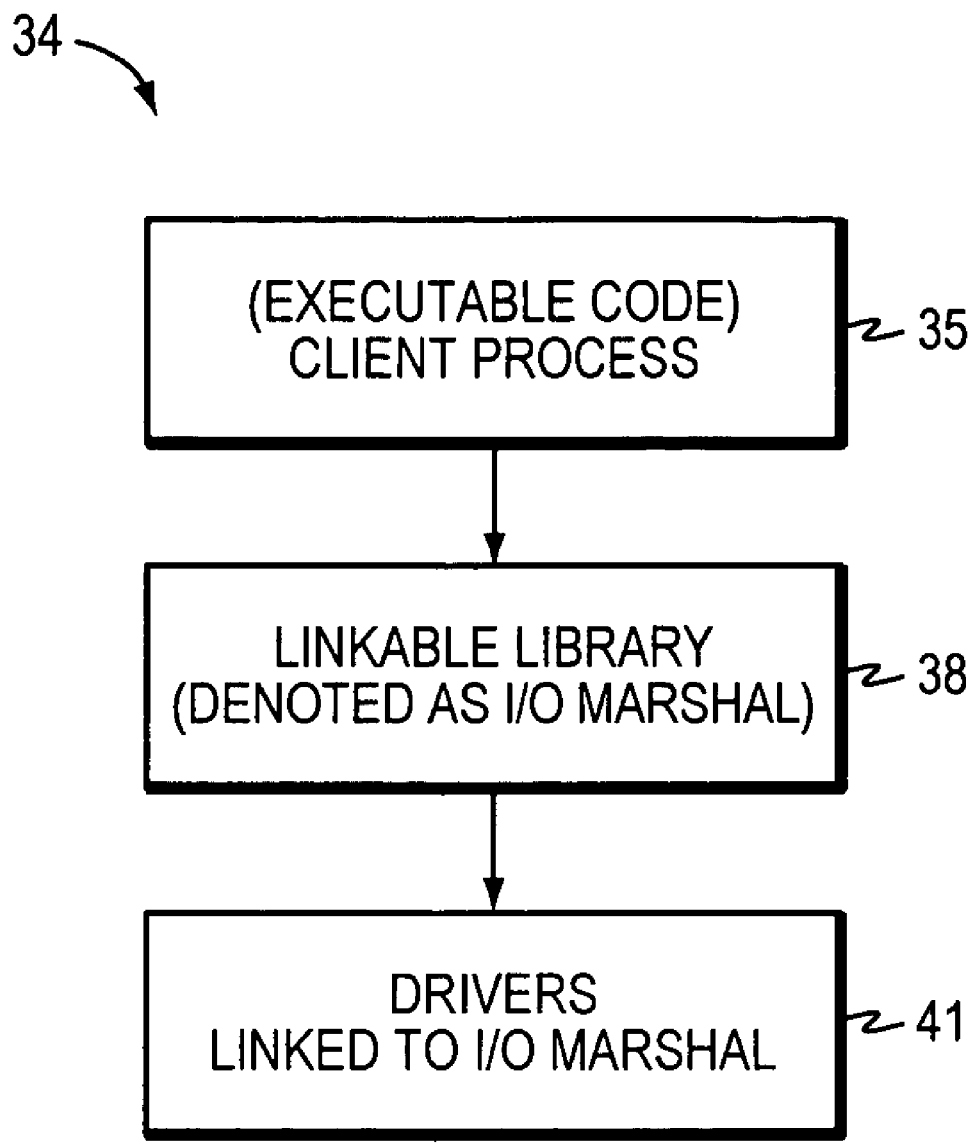
FIG. 2 shows a functional block diagram of components of the program code of FIG. 1.

Referring to FIG. 2, components of program logic 34 include executable code that when loaded into memory 37 and executed by the CPU 31 becomes a computer process. The logic includes Client Process 35 that is served by a linkable library denoted as the I/O Marshal 38, which is also part of program logic 34. The Client Process in general may be any computer process configured to engage and link to the library, and in a preferred embodiment is represented by drivers that are unlinked to the library. The I/O Marshal library in a preferred embodiment is linked to stacked layered drivers 41 discussed in more detail in reference to FIG. 3, and which are also part of the program logic 34. The I/O Marshal 38 when linked to one of the drivers becomes executable for carrying out functions described herein, and when unlinked is available as a library. It is preferred that the I/O Marshal be dynamically linked to follow a protocol of a kernel-mode library in the Microsoft Windows operating system computing environment. Each link has a copy of the library code so it actually operates in that environment statically, but the library may also be linked dynamically if the environment supports such, i.e. it may be linked as a dynamically linked library (DLL) under supporting conditions for a DLL.

Figure 3:
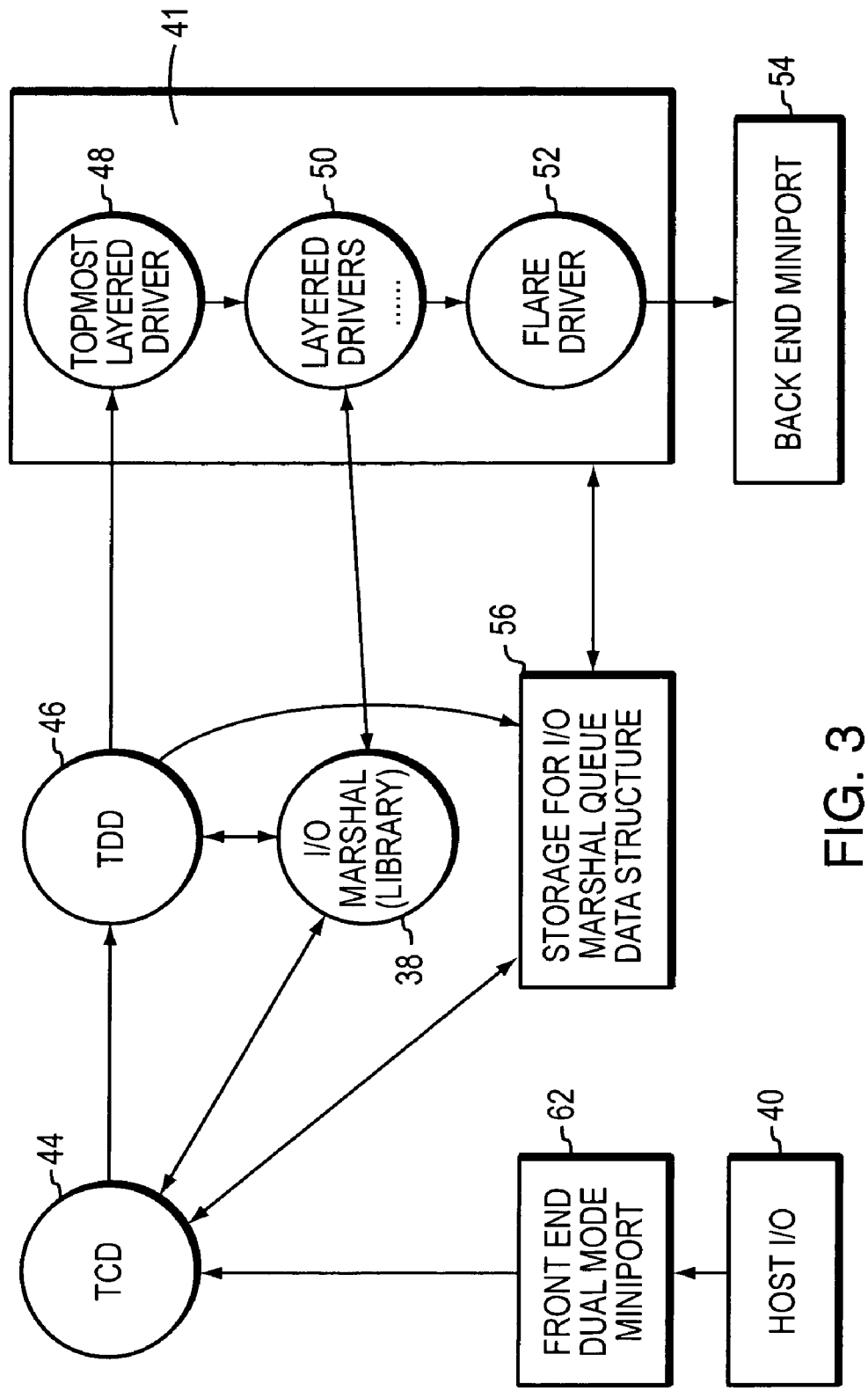
FIG. 3 shows another functional block diagram of components of the program code of FIGS. 1 and 2.

Referring to FIG. 3, a schematic functional block diagram shows the relationship of the I/O Marshal library to the drivers 41 that include a topmost layer driver 48, other layered drivers 50, and the Flare Driver 52 that functions as the operating system driver for the data storage system. The library is also available to a TCD or TDD driver, the function of which is described herein. Host I/O 40 are I/O commands for read or write from production server 14, and may be application commands such as database commands that affect production data on the source system. There is a need to have such data consistent with the data copy 24 on the target system and Consistency Groups are provided in the preferred embodiment to accomplish that. Consistency Group operations ensure that remote mirrored data volumes also referred to as logical units in a group of data volumes or logical units on the source system are consistent with their replica volumes or logical units on the target system. Consistency Group operations may also ensure that consistency may be maintained across multiple logical units on the same data storage system. This functionality is enabled by the I/O Marshaling function described herein.

In general the I/O Marshaling function is carried out in the following manner. The I/O Marshal is used to pend or hold I/O's for individual logical units (LU's or LUN's) while an operation is in progress. The marshaling function is then used across multiple LU's to create a consistent point in time of dependent I/Os for a group of LU's. Any I/O generated by the host (e.g., I/O Number 1) will be held by the I/O marshal while an operation is in progress. If another I/O in the host (e.g., I/O Number 2) dependent upon the completion of I/O 1, will not be forwarded to the array until I/O number 1 completed. As such the I/O marshal is used to hold up I/O's and create a consistent set of host useable data across multiple LU's in an array during certain operations. This functionality is necessary for Consistency Group operations to ensure that remote mirrored LU's in a group all maintain a consistent view of data. In this manner all dependent I/Os for a specific point in time will be mirrored to remote LU's in a group.

The I/O Marshal performs the individual operations in the following manner: The I/O Marshal exposes a data structure (discussed in detail with reference to FIG. 7, below) to be allocated per queue as well as an interface that manipulates that queue. Each layered driver that uses the I/O Marshal must allocate an I/O Marshal queue data structure for each queue of I/O requests. It is a recommended that I/O Marshal clients embed the I/O Marshal queue data structure in its device extension, if applicable to the client. However, there may be instances where a global queue is required, and one skilled in the art will recognize such choices made possible by this invention. Once allocated and initialized the client can perform any I/O Marshal operation on the queue. Clients can operate on multiple queues at one time. Each queue acts independently. An I/O request may be a member of only one queue at a time.

Referring again to FIG. 3, storage for the I/O Marshal Queue Data Structure (FIG. 7) is provided in memory 56. Such drivers include, in a preferred embodiment, the Target Class Driver 44 and Target Disk Driver 46 (TCD/TDD) that comprise a driver layer provides SCSI Target support in communication with the Copy Manager and the front end dual mode miniport (front end) 62 that is part of communication ports 29 (FIG. 1). These drivers handle non-read and write SCSI commands (such as INQUIRY, REPORT_LUNS, etc). The drivers are also responsible for error handling, when errors cannot be masked by the driver layers below, the TCD/TDD is responsible for creating the SCSI error response to send back to the host.

The TCD/TDD Layer also implements support for the preferred CLARiiON functionality which provides the means of identifying what LUN's each initiator should see. This is known as LUN masking. The feature also provides for LUN mapping whereby the host visible LUN is translated to an instance-based LUN. When one of the LUN's is a front end device the Driver issues I/Os by issuing SCSI reads or writes via the front end, e.g. via a fibre channel front end in a preferred embodiment. Local LUN's are accessed by sending I/O request packets disk driver stack, beginning with whatever driver is attached immediately below the TDD driver, i.e. the topmost layered driver 48 and other layered drivers 50 that communicate in the driver stack within the preferred operating system driver, which operates in cooperation with the Flare Driver 52 of the Clariion data storage system in a preferred embodiment.

The I/O Marshal is linkable with the collection of Drivers as shown in FIG. 3. The front end miniport is accessed indirectly by the TCD and initiator-mode I/O requests are sent through a standard SCSI Port Driver (not shown), which in turn communicates with the front end 62. A back end miniport (back end) 54 is also accessed by the Flare Driver.

Figure 4:
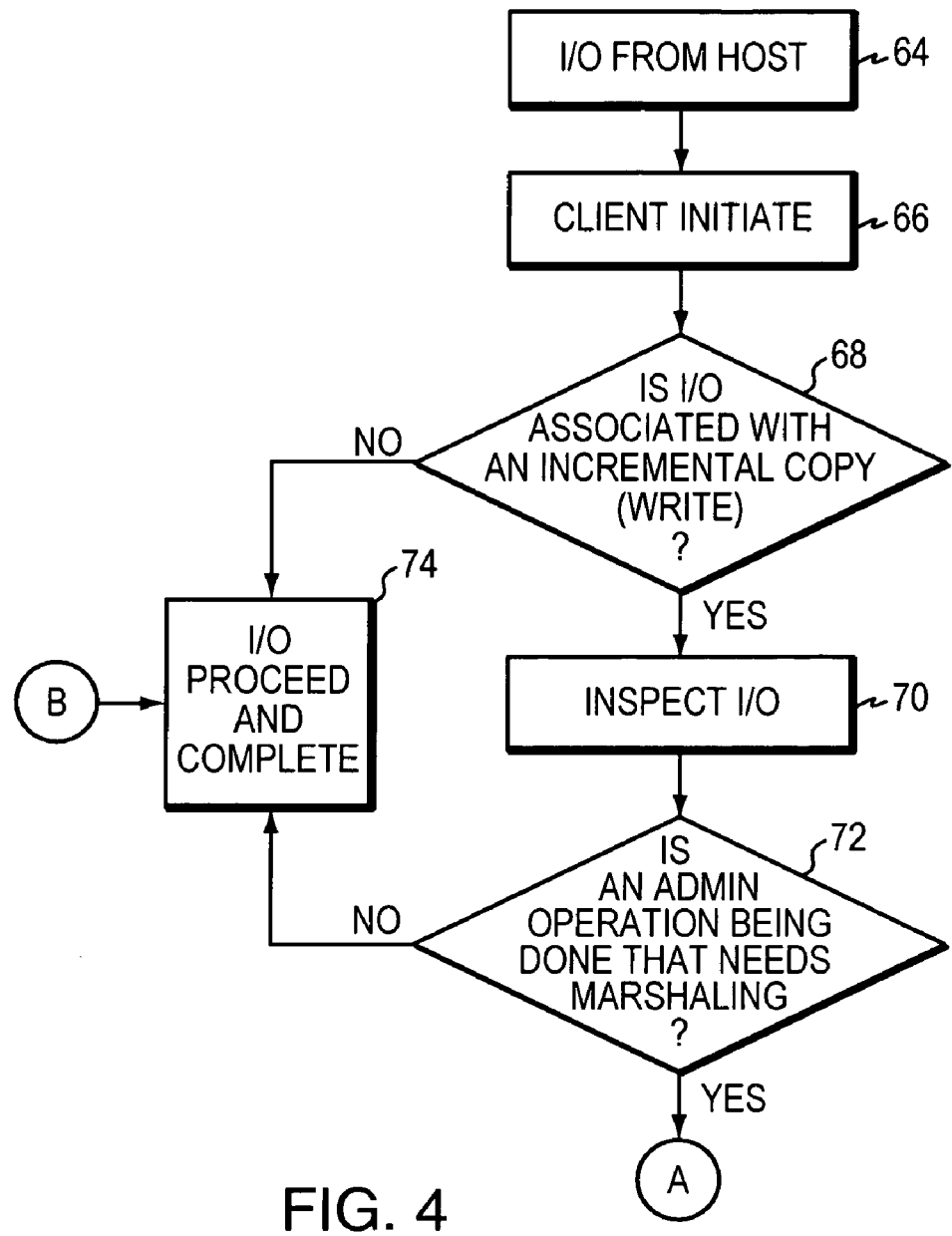
FIG. 4 shows a flow logic diagram of a method embodiment of the present invention.

Referring to FIG. 4, a flow logic diagram is shown that shows method steps included in a method embodiment of this invention. In step 64, an I/O command is initiated from the host and passed to the source data storage system. The client process initiates an action and a determination is made whether the I/O Marshal shall be invoked in step 66. In step 68, an inquiry is made to determine whether the I/O is associated with an incremental copy or write operation. If it is, the I/O itself is inspected in step 70, to determine if an administrative (admin) operation is being performed that requires marshaling, and in which case processing flows to connecting step "A" which continues in steps shown in FIG. 5, discussed below. If the answer to the query in step 68 is no or there is no admin operation in step 72 that needs marshaling then the I/O proceeds and eventually completes in step 74 (connecting step "B" shown flowing into step 74 connects to steps in FIG. 6, discussed below).

Figure 5:
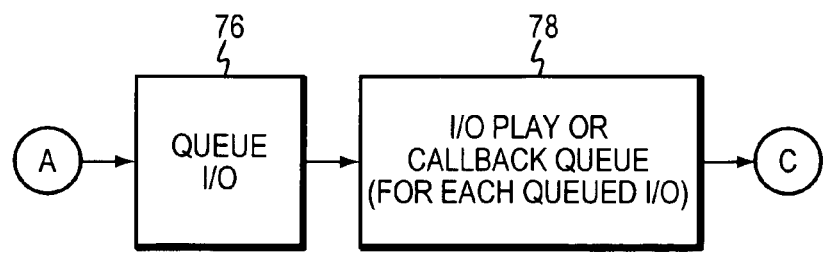
FIG. 5 shows another flow logic diagram of a method embodiment of the present invention.
Figure 6:
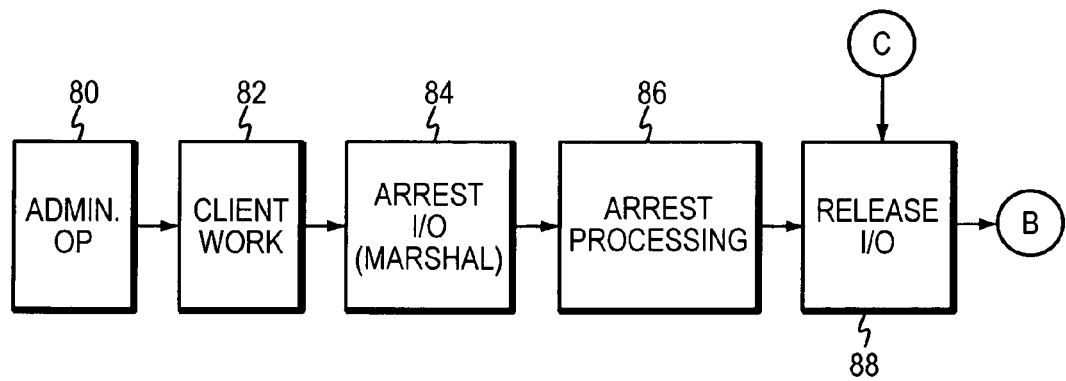
FIG. 6 shows another flow logic diagram of a method embodiment of the present invention.
Figure 7:
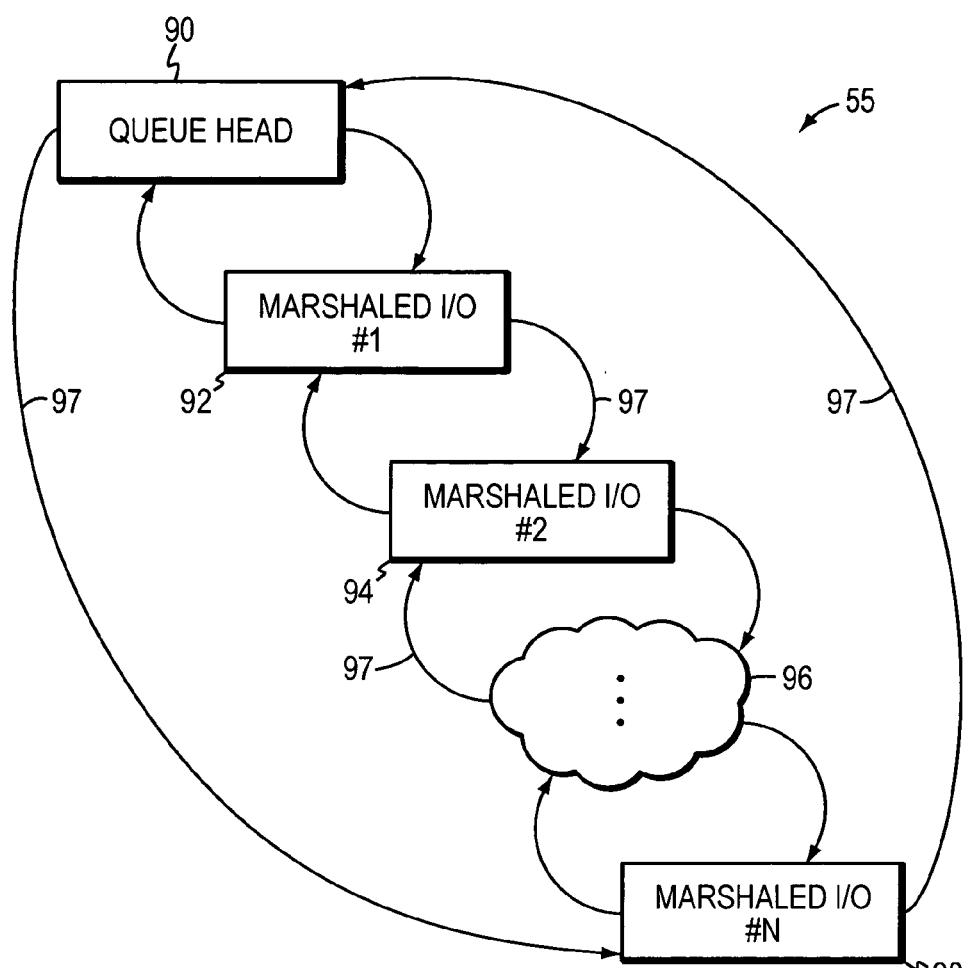
FIG. 7 shows a data structure used by the program logic of FIGS. 1, 2, and 3.

Reference is made now to FIGS. 4-7. Referring to FIG. 5, connecting step "A" leads to step 76 when the response to the query in step 72 is yes. The I/O is queued into a data structure 55, which may be stored in memory 56 (FIG. 7). Referring to FIG. 7, Data structure 55 includes a queue head with information placed in field 90 that includes identifying and other information, and an example of which is shown below in Table 2. The queue head is double linked (links 97) to each marshaled I/O, e.g., marshaled I/O #1 in field 92, marshaled I/O #2 in field 94, and marshaled I/O #N in field 98, wherein shown clouded field 96 is intended to represent any occurring data fields with marshaled I/O's between I/O #2 and #N. Referring again to FIG. 5, each queued I/O is then played or called back in step 78, and processed and completed in step 74 (FIG. 4) after being released for processing in step 88 (FIG. 6). (In FIG. 5, connecting steps A and C, indicate flow, respectively from/to FIG. 4 and FIG. 6).

Table 2 shows an example of a suitable configuration of the queue head information:

TABLE 2

I/O Marshal Queue Head

Name: I/O MARSHAL
Description: The following defines the queue head for an I/O Marshal. This should be included in some "per-device" data structure. Most likely this will be embedded in a device extension. This data structure should be treated as opaque by the Lb Marshal clients.
//
// Members:
//
// I/O MarshalistEntry
////          List entry to group I/O marshal queues.
// I/O MarshalArrestQueueHead
////          The linked list for the K10 Marshal arrest queue.
//
// I/O MarshalArrestQueueLock
////          The spin lock that protects the I/O Marshal arrest queue.
// Context
////          A parameter from caller points to the "per-device
//            data structure. Most likely a device extension.
// ArrestAllIo
             This boolean indicates to the I/O Marshal whether or not
             all the I/O should be arrested.
// Arrested
//           This boolean indicates whether or not we have been
             arrested. It is cleared on release.
//// ArrestQueueDepth
             This field contains the number of entries in the Arrest
             Queue.
//// RPPlaybackCallbackRoutine
             A caller supplied callback routine used to replay I/O after
//           release
// IRPCancelRoutine
//           A caller supplied callback routine to replay I/O after it
//           has been cancelled
// I/O MarshalType
//           The type of marshaling that the client desires (no new I/O
             or drain).
// I/O MarshalQueueDepth
//           The number of I/Os that are currently outstanding.
// I/O MarshalQueueMaximumDepth
//           The maximum number of I/Os that were ever outstanding.
// I/O MarshalDrainEvent
//           The event signaled when there are no outstanding I/Os.
// I/O MarshalastArrestTimestamp
             The timestamp for the last point in time when the I/O
             Marshal arrested this queue.
//

Referring to FIG. 6, a general overview of the method, includes client work (step 82) being in response to an administrative operation in step 80. In which case the I/O is arrested by the I/O Marshal (step 84) and processing is also arrested in step 86, the I/O is released in step 88 and the I/O proceeds and is complete in step 74.

A system and method for managing consistency between different data volumes on different data storage systems by managing I/O traffic has been described. Having described a preferred embodiment of the present invention, it may occur to skilled artisans to incorporate these concepts into other embodiments. Nevertheless, this invention should not be limited to the disclosed embodiment, but rather only by the spirit and scope of the following claims and their equivalents.

What is claimed is:

1. In a data storage environment having a first set of data storage volumes and a second set of data storage volumes being stored on one or more data storage systems, and production data being stored on the first set of data storage volumes, and a copy of the data denominated as the data copy being stored on the second data storage volumes, a method for maintaining consistency between the first and second data storage volumes, when data is copied from the first data storage volumes to the second data storage volumes in the data storage environment, the method comprising the steps of:

in response to an incremental copy being performed while an administrative operation is being performed on the first data storage system, arresting processing of I/O traffic between the first and second data storage volumes;

queuing any I/O's that follow the arresting of the processing in a queuing data structure; and processing each I/O from the queuing data structure until the I/O processing is complete.

2. The method of claim 1, wherein the first and second data storage volumes are stored on different data storage systems from each other.

3. The method of claim 1, wherein the queuing step is enabled by a linkable library.

4. The method of claim 3, wherein a process running on a host computer is configured for linking with the linkable library for carrying out the queuing step.

5. The method of claim 4, wherein the process is software driven.

6. The method of claim 2, wherein the queuing step is enabled by a linkable library.

7. The method of claim 6, wherein a process running on a host computer is configured for linking with the linkable library for carrying out the queuing step.

8. The method of claim 7, wherein the process is software driven.

9. A system for maintaining consistency between the first and second data storage volumes, when data is copied from the first data storage volumes to the second data storage volumes in the data storage environment, the system comprising:

one or more data storage systems having a first set of data storage volumes and a second set of data storage volumes being stored on the one or more data storage systems, and with production data being stored on the first set of data storage volumes, and a copy of the data denominated as the data copy being stored on the second data storage volumes; and computer-executable program code operation with the one or more data storage systems for enabling the method steps of:

in response to an incremental copy being performed while an administrative operation is being performed on the first data storage system, arresting processing of I/O traffic between the first and second data storage volumes;

queuing any I/O's that follow the arresting of the processing in a queuing data structure; and processing each I/O from the queuing data structure until the I/O processing is complete.

10. The system of claim 9, wherein the first and second data storage volumes are stored on different data storage systems from each other.

11. The system of claim 9, wherein the first and second data storage volumes are stored on a single data storage system.

12. The system of claim 9, wherein the queuing step is enabled by a linkable library.

13. The system of claim 11, wherein a process running on a host computer is configured for linking with the linkable library for carrying out the queuing step.

14. The system of claim 12, wherein the library is linked dynamically.

15. A program product for use in a data storage environment having a first set of data storage volumes and a second set of data storage volumes being stored on one or more data storage systems, and production data being stored on the first set of data storage volumes, and a copy of the data denominated as the data copy being stored on the second data storage volumes, the program product being for maintaining consistency between the first and second data storage volumes, when data is copied from the first data storage volumes to the second data storage volumes in the data storage environment, the program product comprising:

a computer-readable medium operational with the first data storage system and encoded with computer-executable program code for enabling the method steps of:

in response to an incremental copy being performed while an administrative operation is being performed on the first data storage system, arresting processing of I/O traffic between the first and second data storage volumes;

queuing any I/O's that follow the arresting of the processing in a queuing data structure; and processing each I/O from the queuing data structure until the I/O processing is complete.

16. An apparatus for use in a data storage environment having a first set of data storage volumes and a second set of data storage volumes being stored on one or more data storage systems, and production data being stored on the first set of data storage volumes, and a copy of the data denominated as the data copy being stored on the second data storage volumes, the apparatus being for maintaining consistency between the first and second data storage volumes, when data is copied from the first data storage volumes to the second data storage volumes in the data storage environment, the apparatus comprising:

means for responding to an incremental copy being performed while an administrative operation is being performed on the first data storage system, arresting processing of I/O traffic between the first and second data storage volumes;

means for queuing any I/O's that follow the arresting of the processing in a queuing data structure; and means for processing each I/O from the queuing data structure until the I/O processing is complete.

* * * * *